(12) United States Patent
Tohta

(10) Patent No.: US 9,194,881 B2
(45) Date of Patent: Nov. 24, 2015

(54) ACCELERATION DETECTION DEVICE

(75) Inventor: Yuzuru Tohta, Sagamihara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 204 days.

(21) Appl. No.: 13/823,904

(22) PCT Filed: Aug. 3, 2011

(86) PCT No.: PCT/JP2011/067728
§ 371 (c)(1),
(2), (4) Date: Mar. 15, 2013

(87) PCT Pub. No.: WO2012/046498
PCT Pub. Date: Apr. 12, 2012

(65) Prior Publication Data
US 2013/0179002 A1 Jul. 11, 2013

(30) Foreign Application Priority Data

Oct. 5, 2010 (JP) .................... 2010-225351

(51) Int. Cl.
*G06F 19/00* (2011.01)
*G01P 15/00* (2006.01)
*F16H 59/48* (2006.01)
*G01P 21/00* (2006.01)

(52) U.S. Cl.
CPC ............... *G01P 15/00* (2013.01); *F16H 59/48* (2013.01); *G01P 21/00* (2013.01); *B60W 2540/10* (2013.01)

(58) Field of Classification Search
USPC ................ 701/1, 36, 38, 70; 702/87
See application file for complete search history.

(56) References Cited

U.S. PATENT DOCUMENTS

2008/0140291 A1* 6/2008 Kobayashi et al. ............ 701/70
2010/0191494 A1 7/2010 Yamashita

FOREIGN PATENT DOCUMENTS

| CN | 100593119 C | 3/2010 |
|----|-------------|--------|
| EP | 1930731 A2 | 6/2008 |
| EP | 1930733 A1 | 6/2008 |
| JP | 2163663 A | 6/1990 |
| JP | 5142242 A | 6/1993 |
| JP | 11-281672 A | 10/1999 |
| JP | 2008-145151 A1 | 6/2008 |

OTHER PUBLICATIONS

European Patent Office Communication dated Feb. 28, 2014 with the Extended European Search Report from the corresponding European Patent Application No. 11830431.0.

* cited by examiner

*Primary Examiner* — Adam Tissot
(74) *Attorney, Agent, or Firm* — Young Basile

(57) ABSTRACT

An acceleration detection device is provided with a zero point correction unit for correcting a zero point position of a sensor signal by a correction amount based on the acceleration signals when the neutral control starts and ends, respectively, and an acceleration signal Gsen-r that is eliminated of a body vibration from an acceleration signal Gsen-f after passing a filter at transition from a vehicle stationary state to the running state.

5 Claims, 8 Drawing Sheets

ACCELERATION DETECTION DEVICE

TECHNICAL FIELD

The present invention relates to an acceleration detection device.

In the conventional acceleration detection device, based on an acceleration sensor signal of a vehicle in a stopped or stationary state and the other acceleration sensor signal in a transition state in which the vehicle transitions from the stationary state to running state, a drift error due to temperature change or aging is calculated for use in a zero point correction of the acceleration sensor. An example of such technique related to this description is disclosed in Patent Document 1.

PRIOR ART DOCUMENT

Patent Document

Patent Document 1: Japanese Laid-Open Patent Application Publication No. 2008-145151

SUMMARY OF THE INVENTION

Problem to be Solved by the Invention

However, in the prior art described above, the acceleration signal detected during the transition from the stationary state to the running state includes a vehicle body vibration component that occurs due to a brake off operation, the acceleration detection will thus be erroneously corrected for that amount, which leads to deterioration of correction accuracy.

The object of the present invention is to prove an acceleration detection device that may improve the correction accuracy of drift error.

Mechanism for Solving the Problem

According to the present invention, the zero position of the acceleration sensor signal is corrected by a correction value based on an acceleration signal that is eliminated or reduced of the vehicle body vibration component.

Effects of the Invention

Therefore, according to the present invention, by correcting the zero point position of the acceleration sensor signal using the acceleration signal in which a vehicle vibration component has been eliminated, the erroneous correction due to the drift error caused by vehicle vibrations at braking off will be suppressed and improvement in correction accuracy may be achieved.

DESCRIPTION OF REFERENCE SIGNS 9 acceleration sensor
12,31 acceleration detection device
20,32 correction amount restriction or limit unit (correction amount limiting means)
21 zero point correction unit (zero point correcting means)

EMBODIMENTS FOR CARRYING OUT THE INVENTION

In the following, description will be made of a configuration for carrying out the acceleration detection device according to the present invention based on the embodiments.

First Embodiment

[Neutral Control Device]

Figure 1:
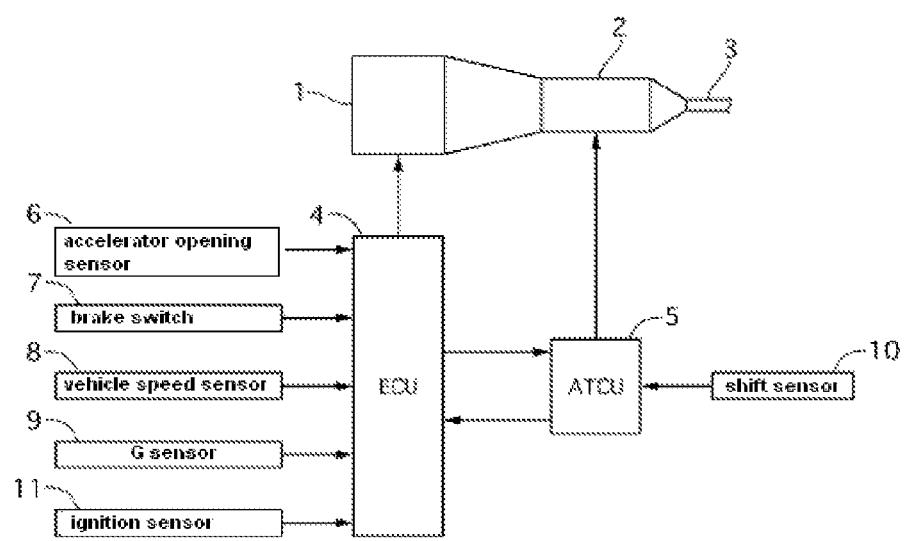
FIG. 1 is a schematic system diagram of a neutral control device equipped with an acceleration detection device in accordance with a first embodiment.

Referring to FIG. 1, a system diagram is illustrated, to which an acceleration detection device of the first embodiment is applied. The output of engine 1 is, after a prescribed change by automatic transmission 2 connected to engine 1, outputted from output shaft 3 to driving wheels not shown. The vehicle is equipped with engine controller (ECU) 4 and automatic transmission controller (ATCU) 5 for controlling engine 1 and automatic transmission 2 respectively based on output signals of various sensors and the like described below. Both controllers 4, 5 are able to communicate to each other.

The vehicle is mounted with various sensors such as an accelerator opening sensor 6, brake switch 7, vehicle speed sensor 8, acceleration sensor (G sensor) 10, shift sensor 10, and ignition sensor 11.

The accelerator opening sensor 6 detects an accelerator opening and outputs the accelerator opening signal to ECU 4. Brake switch 7 outputs a brake switch signal to ECU 4 indicating ON when the brake pedal is depressed, and OFF when the brake pedal is not being depressed. The vehicle speed sensor 8 detects a running speed (vehicle speed) of vehicle based on rotation angle of each wheel detected by a wheel speed sensor mounted to each wheel, and outputs a vehicle speed signal to ECU 4. The G sensor 9 detects a longitudinal acceleration acting on the vehicle and outputs a G sensor signal to ECU 4. The shift sensor 10 detects a shift position of automatic transmission 2 and outputs a shift position signal to ATCU 5. The ignition sensor 11 outputs an ignition signal to ECU 4, which indicates ON when an ignition switch is turned ON, while OFF when the ignition is turned OFF.

ECU 4 outputs a request to ATCU 5 for releasing a clutch (staring clutch) of automatic transmission 2, which is engaged at the time of vehicle start, thereby carrying out a neutral control in a neutral state in which transmission of driving force to driving wheels is disconnected, when the shift position of automatic transmission 2 is in a forward travel or drive position, the vehicle is held in a stopped state or stationary state by brake without depressing on accelerator pedal 2, and a sloping road ramp is less than a predetermined angle (5[%] or less for both ascending and descending road).

In other words, ECU 4 will perform the neutral control provided that the shift position signal from the shift sensor 10 indicates a forward drive position, that the accelerator opening signal of the accelerator opening sensor 6 is zero, that the brake switch signal from the brake switch 7 is ON, that the vehicle speed signal from the vehicle speed sensor 8 is a prescribed value (≈0) and that the acceleration signal from the G sensor 9 indicates an acceleration that corresponds to a sloping road of the prescribed angle of 5[%] or less. At the point in time in which any of the above-described conditions for execution of neutral control is no longer met, such as the brake switch going OFF, ECU 4 will end the neutral control and send a request to ATCU 5 to engage the starting clutch of automatic transmission 2.

[Acceleration Detection Device]

Figure 2:
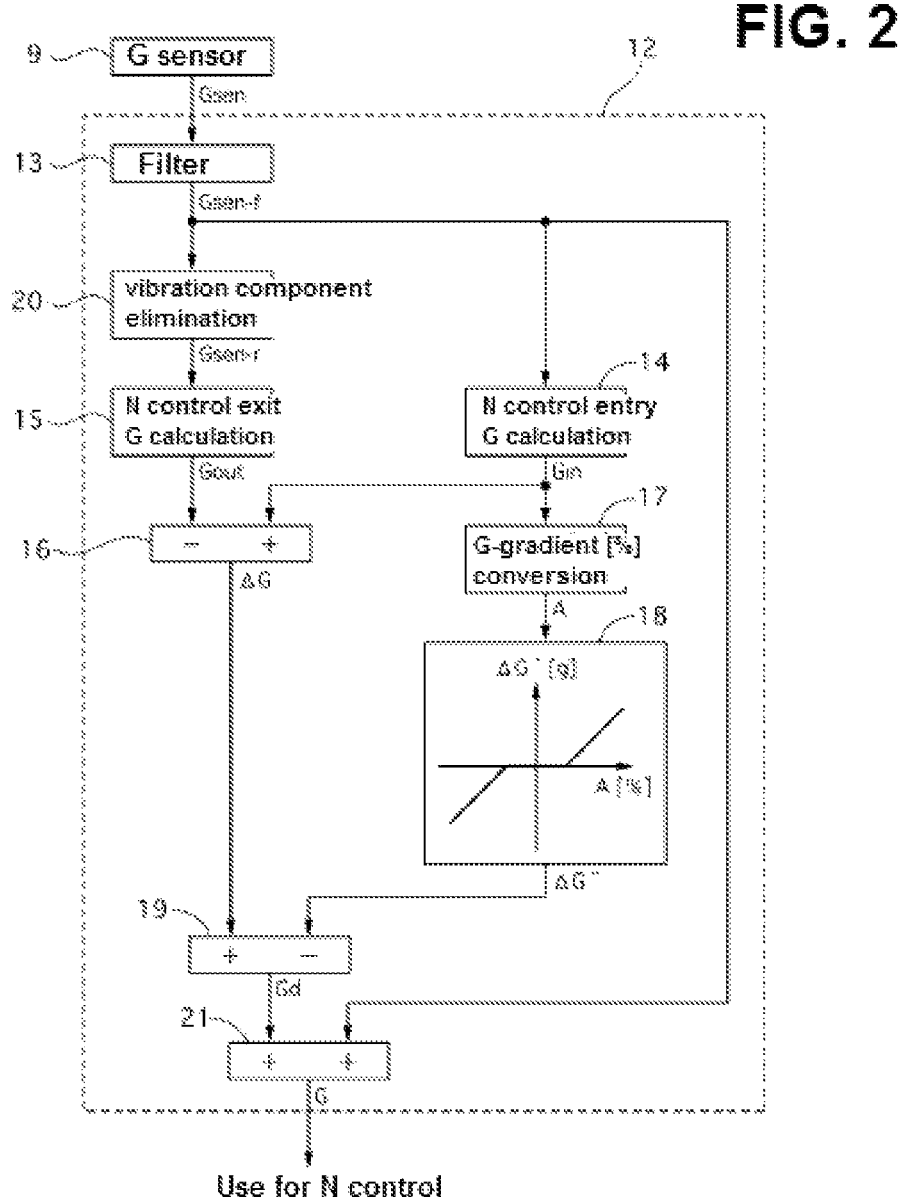
FIG. 2 is a control block diagram depicting a configuration of the acceleration detection device 12 housed in ECU 4 of the first embodiment.

FIG. 2 is a control block diagram depicting a configuration of the acceleration detection device 12 housed in ECU 4, and the acceleration detection device 12 of the first embodiment 1 is provided with a filter 13, a vibration component elimination unit (vibration component eliminating means) 20, an N control entry G calculating unit 14, an N control exit G calculating unit 15, a ΔG calculation unit 16, a G→gradient or ramp conversion unit 17, a ΔG estimation unit 18, a correction value calculation unit 19, and a zero point correction unit (zero point correcting means) 21.

The filter 13 removes a noise component included in G sensor signal (within a range between about 20 and about 30 Hz) Gsen [g] and is formed in a noise-cut filter. Note that the "elimination" may include "reduction" as well in the embodiments.

The vibration component elimination unit 20 outputs a G sensor signal Gsen-r that eliminates a vehicle body vibration component at braking off from the G sensor signal Gsen-f that has passed filter 13 at the transition from a vehicle stationary or stopped state to a running state. In the first embodiment, a first-order delay filter with a cut-off frequency at about 3 Hz is used. A filtering process is posed on the G sensor signal Gsen-f passing through filter 13 so that the vehicle vibration component is eliminated. The vehicle vibration component is detailed below.

The N control entry G calculation unit 14 calculates an acceleration Gin [g] at the N control entry based on G sensor signal Gsen-f after passing through the filter 13 after a predetermined time has elapsed from the start of the neutral control. Note that the predetermined time is the time in which the vehicle vibration generating during stopping operation is sufficiently converged and G sensor Gsen is thereby estimated not to include the vehicle body vibration component associated with the vehicle stop.

The N control exit or digress G calculation unit 15 calculates, based on the G sensor signal Gsen-f passing through filter 13 from a time at the end of the neutral control up to start of driving force transmission to driving wheels in response to the starting clutch engagement in automatic transmission 2, an acceleration Gout [g] at the N control exit that presents the farthest gap from the N control entry acceleration Gin.

More specifically, the N control exit acceleration Gout is representative of a maximum absolute value of acceleration occurring due to the vehicle rolling back immediately after completion of the neutral control that has been in place on a sloping road with a predetermined ramp gradient or more.

The ΔG calculation unit 16 calculates an acceleration change amount detection ΔG [g] by subtracting the N control exit acceleration Gout calculated by N control exit G calculation unit 15 from N control entry acceleration Gin calculated by N control entry G calculation unit 14.

The G→gradient conversion unit 17 converts the N control entry acceleration Gin calculated by N control entry G calculation unit 14 into a gradient A [%] of road surface. In the first embodiment, the gradient for an uphill or ascending road is indicated by positive (+), while that for a downhill or descending slop by negative (−).

The ΔG estimation unit 18 calculates, based on the gradient of road surface A [%] obtained in G→gradient conversion unit 17 and by referring to the gradient-acceleration change amount calculation map, an acceleration change estimate ΔĜ [g]. The relationship between the road surface gradient and the acceleration change amount of vehicle that occurs due to vehicle roll back at the completion of N control remains the same for the same vehicle. Therefore, the gradient-acceleration change amount calculation map may be obtained in advance by experiments and the like.

The correction value calculation unit 19 calculates a correction value Gd [g] by subtracting the acceleration change amount estimate ΔĜ calculated in the ΔG estimation unit 18 from the acceleration change amount detection ΔG calculated in the ΔG calculation unit 16.

The zero point correction unit 21 calculates an acceleration detection value G that corrects the drift error of the G sensor signal Gsen by adding the correction value Gd calculated in correction amount calculation unit 20 to the G sensor signal Gsen-f passing through filter 13 (zero point correction).

As discussed above, the acceleration detection value G thus calculated is used to decide on whether or not to implement the neutral control.

[Acceleration Detection Process]

Figure 3:
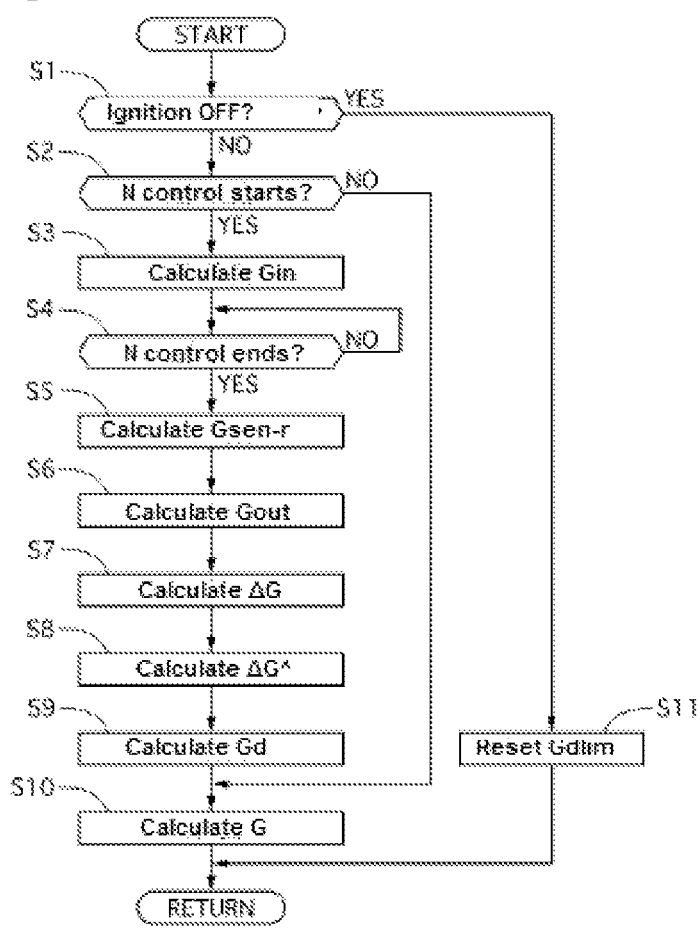
FIG. 3 is a flowchart depicting a flow of acceleration detection process executed by the acceleration detection device 12 of the first embodiment.

FIG. 3 is a flowchart showing a flow of the process to be executed by the acceleration detection device 12 of the first embodiment. A description of each step is now made. This control is executed repeatedly at a predetermined calculation period as long as the ignition is being turned ON.

In step S1, a determination is made whether or not the ignition switch has been turned OFF, and, if YES, control proceeds to step S11, and if NO, control proceeds to step S2.

In step S2, a determination is made whether or not the neutral control has been started, and, if YES, the control proceeds to step S3, while at NO determination, to step S10.

In step S3, in the N control entry G calculation unit 14, the acceleration at the N control entry Gin [g] is calculated.

In step S4, a determination is made whether or not the neutral control has been completed. If YES, control proceeds to step S5, while if NO step S4 is repeated.

In step S5, the vibration component elimination unit 20 calculates a G sensor signal Gsen-r that eliminates a vehicle body vibration component after the G sensor signal has passed through filter 13.

In step S6, in the N control exit G calculation unit 15, the acceleration Gout [g] at the N control exit (the neutral control exit acceleration) Gout is calculated.

In step S7, the ΔG calculation unit 16 calculates an acceleration change amount detection ΔG [g] by subtracting the acceleration Gout at the N control exit calculated in step S6 from the acceleration Gin at N control entry calculated in step S3.

In step S8, the ΔG estimation unit 18 calculates an accelerator change amount estimate ΔĜ [g], based on the road surface gradient A [%], which is converted by the G→gradient conversion unit 17 and by referring to the gradient-acceleration change amount calculation map.

In step S9, the correction value calculation unit 19 calculates a correction value Gd [g] by subtracting the acceleration change amount estimate ΔĜ that is calculated in step S8 from acceleration change amount detection ΔG that is calculated in step S7. Therefore, correction value Gd will assume a positive value in the case of ΔG>ΔĜ, whereas in the case of ΔG<ΔĜ, a negative value is obtained.

In step S9, in zero point correction unit 21, an acceleration detection value G is calculated by adding the correction value Gd to the G sensor signal Gsen-f after passing through filter 13, thereby correcting the drift error of G sensor signal Gsen. Note that if control advances to this step from step S9, an acceleration detection value G is calculated by using the correction value Gd calculated in step 39, and updates the stored correction value Gd. On the other hand, if control proceeds to this step from step S2, an acceleration detection G is calculated using the stored correction value Gd.

In step S11, in the zero point correction unit 21, the correction value Gd is reset (to zero) and control returns.

Now, operation is described.

[Zero Point Correction Operation Due to Acceleration Change Amount at the Vehicle Roll Back]

When the driver releases the foot from brake pedal during execution of the neutral control on a sloping road, the vehicle rolls back until a starting clutch of automatic transmission 2 starts to engage. In the acceleration detection device 12 in the first embodiment, by making use of this acceleration change occurring due to this rollback, a drift error of G sensor signal Gsen is corrected. More specifically, by calculating both the acceleration change amount detection ΔG based on a change in G sensor signal Gsen (N control entry acceleration Gin–N control exit acceleration Gout) and the acceleration amount change estimate ΔĜ estimated by G sensor signal Gsen at the stationary vehicle, based on the difference of the two, a correction value Gd is calculated to correct the drift error of G sensor signal Gsen to thereby performing a zero point correction on G sensor signal Gsen.

If there is a drift error in G sensor signal with changes in time and temperature, the N control entry acceleration Gin that is calculated based on G sensor signal Gsen deviates from a true value (an actual acceleration) by a drift error. On the other hand, the acceleration change amount detection ΔG representative of a difference between the N control entry acceleration Gin and N control exit acceleration Gout is not affected by the drift error (i.e., not including drift error). Thus, by taking the difference between acceleration change detection ΔG and acceleration change amount estimate ΔĜ, the correction value Gd for canceling the drift error of the G sensor signal Gsen may be obtained with accuracy and more accurate zero point correction may be realized.

[Inhibitory Operation of Erroneous Correction Due to Vehicle Vibration]

Figure 4:
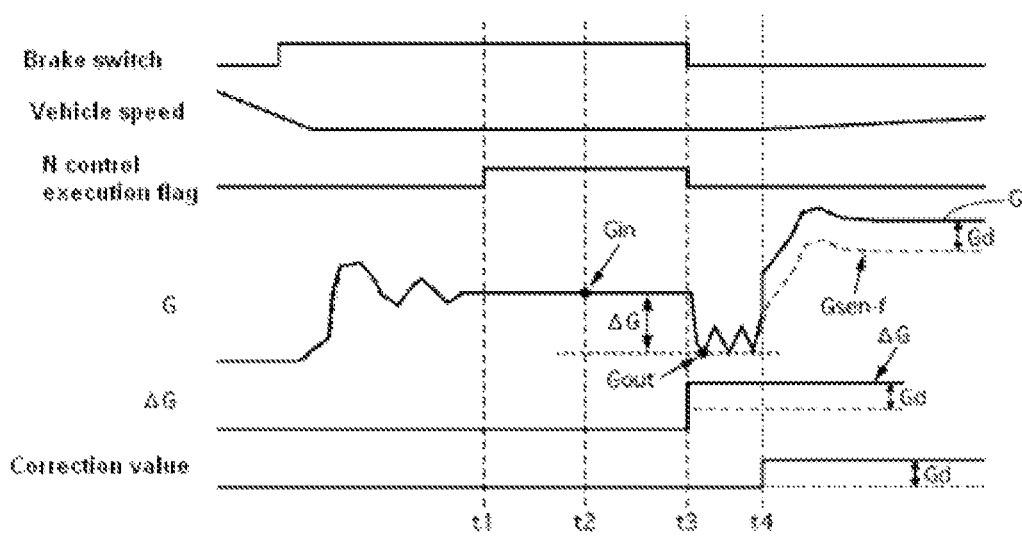
FIG. 4 is a time chart depicting the logic of erroneous correction occurrence at the time of zero point correction in the conventional technology.

FIG. 4 is a time chart depicting the logic of erroneous correction occurrence at the time of a zero point correction in the conventional technology. It is assumed that the vehicle is stopped on an uphill road.

At time t1, the neutral control execution condition is satisfied, and neutral control is started.

At time t2, based on the G sensor signal Gsen-f after passing through the filter 13 after the predetermined time has elapsed from the start of the neutral control, the N control entry acceleration Gin is calculated.

At time t3, because the driver releases the foot from the brake pedal to exit the neutral control, and for a period between t3 and up to t4, a roll back of the vehicle occurs.

At time t4, out of G sensor Gsen-f signal after having passed through the filter 13, such a G sensor signal Gsen-f is identified as a N control exit acceleration Gout, that is positioned the farthest from the N control entry acceleration to obtain both acceleration change amount detection ΔG and acceleration change amount estimate ΔĜ. Correction value Gd is then calculated from the difference between the two, and thereafter and for the time period until the next neutral control will end, a gradient determination will be made for neutral control using the acceleration detection value G that was corrected for drift error by that correction value Gd.

Here, during a period from time t3 to time t4, when the vehicle, transitions from the stationary state to the driving state, the G sensor signal Gsen includes a vehicle body vibration component occurring due to braking off. As the vehicle vibration component, the following two events are presumed.

(a) Vibration due to a release by braking off of a twisted torque in a power train that has occurred due to a stopping of vehicle in response to braking on (at about 5 Hz).

(b) Vibration due to a suspension vibration associated with change in a suspension stroke caused by change in a vehicle attitude or posture attributable to (a) or vehicle rolling back.

These vehicle body vibration components may not be eliminated by the noise-cut filter 13 disposed downstream of G sensor 9 and are still contained in the G sensor signal Gsen-f that has passed through filter 13. Therefore, the G sensor signal Gsen-f after passing through filter 13 oscillates with large magnitude as shown in FIG. 4. Thus, when, out of the peak points, such a peak point with the remotest distance from the N control entry acceleration Gin is selected as the N control exit acceleration. Then the acceleration change amount detection Gd (=ΔG–ΔĜ) becomes smaller than the value detected by the rollback of the vehicle with the result that an excessive correction value Gd (=ΔG–ΔĜ) is calculated. Consequently, for the time period after the time t4, since the acceleration detection value G will be corrected smaller than the acceleration corresponding to the actual gradient of road surface, even a flat road may be erroneously determined as a sloping road with over 5% gradient and the neutral control may not be allowed with associated deterioration in fuel consumption.

In contrast, in the acceleration detection device of first embodiment, at the upstream of N control exit G calculation unit 15, i.e. prior thereto, a filtering process is done on the G sensor signal Gsen-f that has passed filter 13 by vibration component elimination unit 20 that eliminates the frequency components due to vehicle vibration included in the G sensor signal Gsen-f. Since the cut-off frequency for the filtering process is set at about 3 Hz, such G sensor signal Gsen-r may be obtained that does not include a frequency component of the vibration attributable to twisting release in the power train (at about 5 Hz) and the frequency component of the vibration attributable to the suspension vibration (at about 12 to 13 Hz). Thus, by obtaining the G sensor signal Gsen-r after passing through vibration component elimination unit 20 during a period between time t3 and time t4 with the vehicle vibration component removed, the calculation of an excessive correction amount due to the vehicle body vibration at braking off may be suppressed and such a situation may be inhibited in which the acceleration detection value G is corrected excessively moderate as compared to the acceleration corresponding to the actual road surface gradient.

In the first embodiment, when an ignition switch has been turned OFF, the correction value Gd is reset (to zero). Generally, for the time period from the time at which ignition switch has been turned OFF to the time of next turning ON, because the ambient temperature of the G sensor 9 is changed, the drift error of G sensor signal Gsen also changes. Assuming that the correction value Gdlim would not be reset, during a period up to execution of neutral control, there is a possibility that G sensor signal Gsen would be corrected by the correction value separated from the actual drift error. Thus, by resetting the correction value Gd each time the ignition switch is turned OFF, an erroneous correction of G sensor signal Gsen will be suppressed during the next travel.

Now description is made of the technical effects.

The acceleration detection device 12 of the first embodiment has the effects listed below.

(1) The acceleration detection device 12 is provided with a vibration component elimination unit 20 that eliminates a vehicle body vibration component included in a G sensor signal after passing through or downstream of filter 13, and a zero point correction unit 21 to correct a zero point position of the G sensor signal Gsen-f after passing through the filter 13 by a correction value Gd based on a G sensor signal Gsen-r after the vehicle, body vibration component being eliminated.

Therefore, an erroneous correction of drift error due to vehicle vibration cased by the braking off operation to thereby improve in the correction accuracy.

(2) The vibration component elimination unit 20 is configured to eliminate the vehicle vibration component (of about 5 Hz) caused by release of twisting in the power train so that a correction value Gd may be calculated based on a G sensor signal Gsen-r the vibration component of which attributable to the release of twisting in the power train is eliminated to thereby suppressing the erroneous correction of the drift error.

(3) The vibration component elimination unit 20 is configured to eliminate the vehicle vibration component (of about 12 to 13 Hz) caused by a suspension vibration so that a correction value Gd may be calculated based on a G sensor signal Gsen-r the vibration component of which attributable to the suspension vibration.

(4) Since the vibration component elimination unit 20 is configured to do a filtering treatment on a plurality of G sensor signals Gsen-f after passing through the filter 13, the vehicle body vibration component may be eliminated effectively from the G sensor signal Gsen-f after passing through filter 13.

Second Embodiment

[Acceleration Detection Process]

Figure 6:
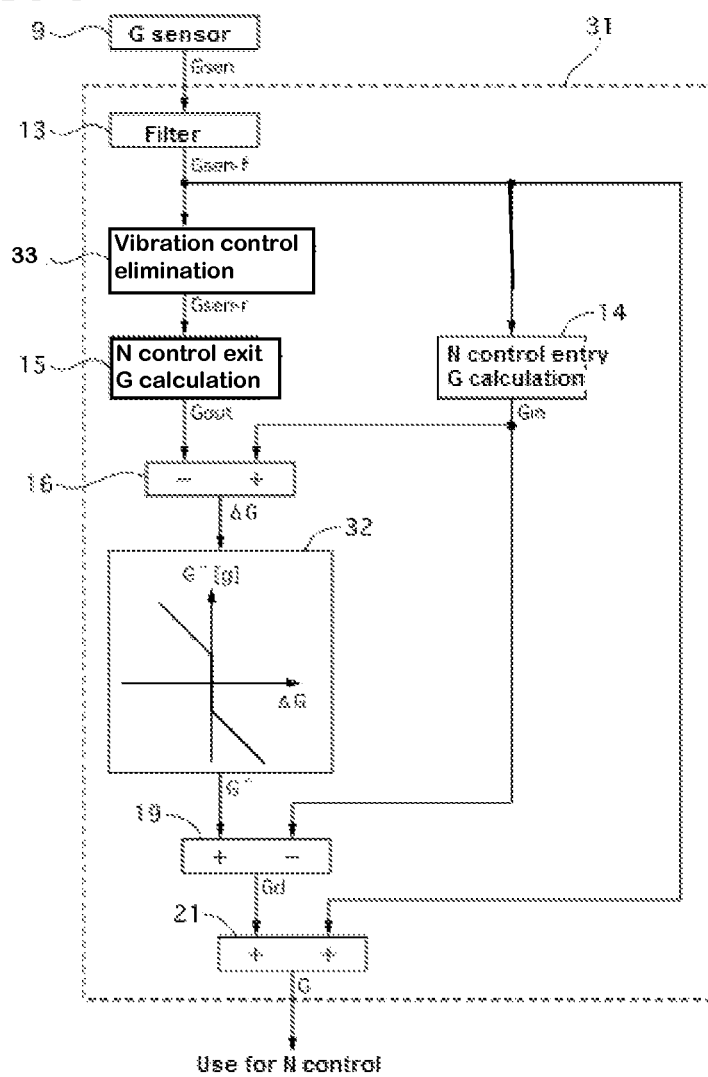
FIG. 6 is a control block diagram depicting a configuration of the acceleration detection device 31 housed in ECU 4 of the second embodiment.

FIG. 6 is a control block diagram depicting a configuration of the acceleration detection device 31 incorporated in ECU 4 of the second embodiment. The acceleration detection device of the second embodiment is provided with a filter 13, a vibration component elimination unit (vibration component eliminating means), N control entry G calculation unit 14, N control exit (3 calculation unit 15, ΔG calculation unit 16, acceleration estimation unit 32, correction value calculation unit 19, and zero point correction unit 21.

The vibration elimination unit 33 eliminates the vehicle body vibration component at braking off from the G sensor signal Gsen-f passing through filter 13 at the transition from stationary to running state for outputting an G sensor signal Gsen-r. In the second embodiment, a plurality of G sensor signals Gsen-f obtained during a predetermined period of time in which such G sensor signal Gsen is available that presents the farthest or remotest gap from the N control entry acceleration Gin will be averaged to output the Gsen-r during the period between the neutral control completion and the time at which a driving force stats to transmit to driving wheels due to the engagement start of starting clutch in automatic transmission 2.

The N control exit G calculation unit 15 sets the G sensor signal Gsen-r output from the vibration component elimination unit 33 eliminating the vehicle body vibration component as the N control exit acceleration Gout.

The acceleration estimation unit 32 calculates an acceleration estimate G^[g], based on the acceleration change detection value ΔG calculated by ΔG calculation unit 16 and referring to the acceleration change amount-gradient equivalent acceleration calculation map. The acceleration change amount occurring due to a vehicle rollback in response to the N control completion and road surface gradient is the same for the same vehicle, and the road surface gradient may be converted to an acceleration, the acceleration change amount-gradient equivalent acceleration calculation map may be acquired in advance by way of experiments.

The correction value calculation unit 19 calculates a correction value Gd [g] by subtracting the N control entry acceleration Gin from the acceleration estimate G^ calculated in acceleration estimation unit 32.

Figure 7:
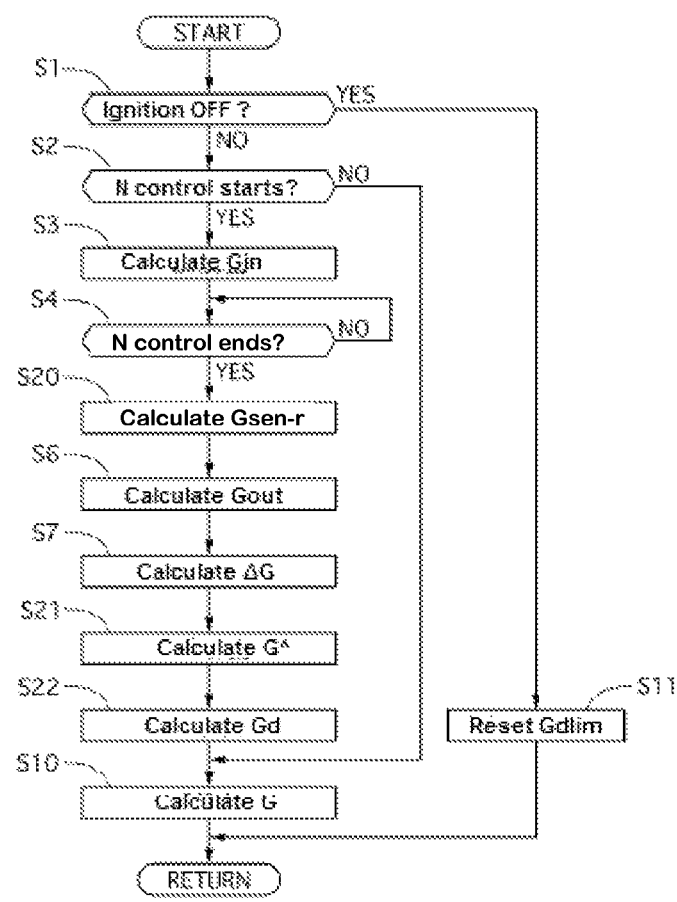
FIG. 7 is a flowchart depicting a flow of acceleration detection process executed by the acceleration detection device 31 of the second embodiment.

FIG. 7 is a flowchart depicting a flow of an acceleration detection process executed by the acceleration detection device 31 of the second embodiment. Now, description is made of each step. Note that, by attaching the same step number to those performing the same process as the first embodiment shown in FIG. 3, the duplicate description is omitted.

In step S20, the vibration component elimination unit 33 calculates a G sensor signal Gsen-r that eliminates the vehicle body vibration from the G sensor signal that has passed filter 13.

In step S21, the acceleration estimation unit 32 calculates an acceleration estimate G^ [g] based on the acceleration change amount detection ΔG calculated in step S6 and by referring to the acceleration change amount-gradient equivalent acceleration calculation map.

In step S22, the correction value calculation unit 19 calculates a correction value Gd [d] by subtracting the N control entry acceleration Gin from the acceleration estimate G^ calculated in step S21.

Now, description is made of operation.

[Zero Point Correction Operation Based on Acceleration Change Amount at the Rollback of the Vehicle]

The acceleration detection device 31 of the second embodiment calculates a correction value Gd for correcting a drift error of G sensor signal Gsen based on a difference between the acceleration estimate G^ derivable from change in G sensor signal Gsen (i.e. N control entry acceleration Gin–N control exit acceleration Gout) and the N control entry acceleration Gin in order to perform zero point correction of G sensor signal.

When a drift error in G sensor signal is occurring due to temperature change or aging, the N control entry acceleration Gin calculated based on G sensor signal deviates from the true value by the drift error. On the other hand, the acceleration estimate G^ that is calculated from the difference between the N control entry acceleration Gin and the N control exit acceleration Gout is free from influence of the drift error (i.e. not inclusive of the drift error). Thus, by taking the difference between the acceleration estimate G^ and the N control entry acceleration Gin, a correction value that cancels the drift error in G sensor signal Gsen may be obtained with accuracy so that even more accurate correction of zero point will be achieved.

[Inhibitory Operation on Erroneous Correction Due to Vehicle Body Vibration]

Figure 8:
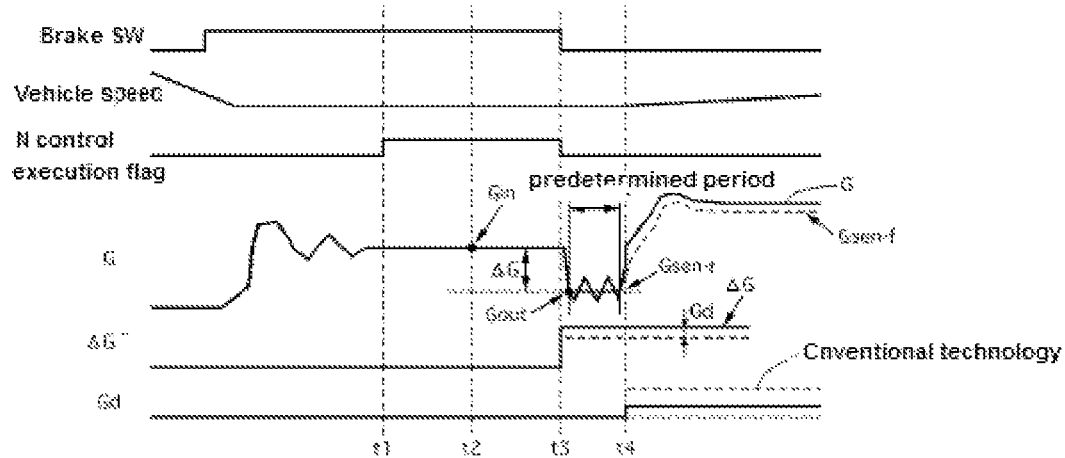
FIG. 8 is a time chart depicting an inhibitory operation of erroneous correction in the second embodiment.

FIG. 8 is a time chart depicting the inhibitory operation on erroneous correction in the second embodiment.

Figure 5:
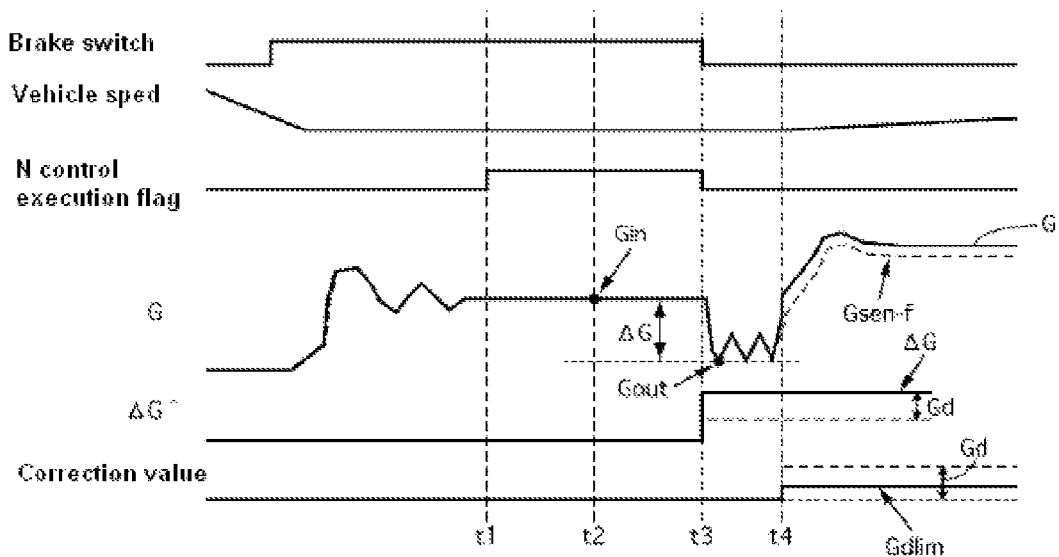
FIG. 5 is a time, chart depicting an inhibitory operation of the erroneous correction in the first embodiment.

With respect to the period between time t1 and t3, the description is omitted because of the same operations as illustrated in FIGS. 4 and 5.

At time t3, because the driver releases the foot from the brake pedal to exit the neutral control, for a period between t3 and up to t4, a rollback of the vehicle occurs.

At time t4, out of G sensor Gsen-f signals after having passed through the filter 13, such G sensor signals Gsen-f are averaged and set as a N control exit acceleration Gout to obtain both acceleration change amount detection ΔG and acceleration change amount estimate ΔG^. Correction value Gd is then calculated from the two, and subsequently, i.e., until the next neutral control ends, a gradient determination will be made for neutral control using the acceleration detection value G that was corrected for drift error by that correction value Gd.

In the acceleration detection device 31 in the second embodiment, an averaging process is applied to the G sensor signal that has passed filter 13 at the upstream of, or prior to entry to, the N control exit G calculation unit 15, and the vehicle body vibration component is thus be eliminated that is included in the G sensor signal Gsen-f. Averaging process to the G sensor signal Gsen-f will make such a G sensor signal Gsen-r available that is free from the vibration due to twisting release in the power train and suspension vibration related vibration.

Therefore, calculation of an excessive calculation value Cd due to vehicle body vibration at braking off may be suppressed, and the acceleration detection value G is inhibited from corrected excessively moderate with respect to the acceleration corresponding to the actual road surface ingredient.

Next, the technical effects will be described.

In the acceleration detection device 31 of the second embodiment, in addition to the effects of (1) to (3) of the first embodiment, the following effect may be achieved.

(5) The vibration component elimination unit 20 apples the averaging process to the G sensor signal Gsen-f after a plurality of filters 13 obtained at transition from the station state to the running state so that the vehicle body vibration component may be effectively eliminated from the G sensor signal Gsen-f that has passed filter 13.

Other Examples

Although the configuration for carrying out the present invention has been described above with reference to embodiments, the specific configuration of the present invention is not limited to these embodiments, and design changes and the like without departing from the gist of the present invention may be included within the present invention.

For example, the filter for filtering process is not limited to a first order delay or lag filer, but such a filter as a second-order lag filter or band-path filter may be used.

The method for averaging process is not limited to an arithmetic averaging process, but geometric mean or harmonic mean may be used.

The correction method of the acceleration detection value G according to the present invention is not limited to the neutral control completion, but may be applicable at the end of an idle stop control with the similar effects as the embodiments.

The invention claimed is:

1. An acceleration detection device, comprising:
a vibration component elimination unit that eliminates a vehicle body vibration component included in an acceleration sensor signal, the vehicle body vibration component generated when a brake is released to transition from a vehicle stationary state to a running state, the vibration component elimination unit configured to eliminate the vehicle body vibration component by applying an averaging process on a plurality of acceleration signals obtained at transition from the vehicle stationary state to the running state; and
a zero point correction unit that corrects with a correction value a zero point position of the acceleration sensor signal after the vehicle body vibration component is eliminated from the acceleration sensor signal.

2. The acceleration detection device claimed in claim 1, wherein the vibration component elimination unit is configured to eliminate the vehicle body vibration component caused by release of twisting of a power train of a vehicle when the brake is released.

3. The acceleration detection device claimed in claim 1, wherein the vibration component elimination unit is configured to eliminate the vehicle body vibration component caused by a suspension vibration of a vehicle when the brake is released.

4. The acceleration detection device claimed in claim 1, wherein the vibration component elimination unit is configured to apply a filtering process on a plurality of acceleration signals obtained at transition from the vehicle stationary state to the running state.

5. The acceleration detection device claimed in claim 1, further comprising a filter directly upstream of the vibration component elimination unit which filters a noise component having a frequency range between about 20 Hz and 30 Hz from the acceleration sensor signal prior to the vibration component elimination unit.

* * * * *